United States Patent
DaCosta et al.

(10) Patent No.: US 7,753,978 B2
(45) Date of Patent: Jul. 13, 2010

(54) FILTER SYSTEM

(75) Inventors: Herbert F. M. DaCosta, Peoria, IL (US); Orhan Altin, Peoria, IL (US); Craig F. Habeger, Chillicothe, IL (US)

(73) Assignee: Caterpillar Inc, Peoria, IL (US)

( * ) Notice: Subject to any disclaimer, the term of this patent is extended or adjusted under 35 U.S.C. 154(b) by 716 days.

(21) Appl. No.: 11/477,516

(22) Filed: Jun. 30, 2006

(65) Prior Publication Data

US 2008/0000206 A1    Jan. 3, 2008

(51) Int. Cl.
*B01D 50/00* (2006.01)
(52) U.S. Cl. .................. 55/385.3; 55/523; 55/524
(58) Field of Classification Search ........... 55/385.3, 55/523, DIG. 30, 524, 529, 330, 484, DIG. 10; 422/177; 96/4, 11
See application file for complete search history.

(56) References Cited

U.S. PATENT DOCUMENTS

| | | | |
|---|---|---|---|
| 4,600,562 A | 7/1986 | Virk et al. | |
| 4,749,671 A | 6/1988 | Saito et al. | |
| 5,171,341 A | 12/1992 | Merry | |
| 5,399,430 A * | 3/1995 | Nordine | 428/366 |
| 5,776,419 A | 7/1998 | Ihara et al. | |
| 5,879,827 A | 3/1999 | Debe et al. | |
| 6,042,959 A * | 3/2000 | Debe et al. | 429/33 |
| 6,935,105 B1 | 8/2005 | Page et al. | |
| 6,942,708 B2 | 9/2005 | Peter et al. | |
| 7,052,532 B1 | 5/2006 | Liu et al. | |
| 2004/0043899 A1 | 3/2004 | Mangold et al. | |
| 2004/0176246 A1 * | 9/2004 | Shirk et al. | 502/439 |
| 2005/0115216 A1 * | 6/2005 | Bauer et al. | 55/524 |
| 2005/0159310 A1 | 7/2005 | Ohno et al. | |
| 2006/0057046 A1 | 3/2006 | Punke et al. | |

FOREIGN PATENT DOCUMENTS

| | | |
|---|---|---|
| EP | 0 745 759 | 4/1996 |
| EP | 1598111 A1 | 11/2005 |
| WO | WO 2005/047662 A1 | 5/2005 |
| WO | WO 2006/030189 | 3/2006 |

* cited by examiner

*Primary Examiner*—Michael A Marcheschi
*Assistant Examiner*—Karla Hawkins
(74) *Attorney, Agent, or Firm*—Finnegan, Henderson, Farabow, Garrett & Dunner

(57) ABSTRACT

A filter for engine exhaust gases includes a housing coupled to an engine to receive engine exhaust gases, and a filter media which is located in the housing. The filter media includes a plurality of filter passages, and a plurality of particles of a transition metal deposited on at least a portion of the filter media. The size of the particles are approximately thirty nanometers or less.

13 Claims, 4 Drawing Sheets

FILTER SYSTEM

TECHNICAL FIELD

The present disclosure relates generally to a filter system, and more particularly to a filter system having regeneration capabilities.

BACKGROUND

Internal combustion engines exhaust a complex mixture of chemical species. These chemical species may include gaseous and solid materials, including particulate matter, nitrogen oxides ("NOx"), and sulfur compounds.

Due to heightened environmental concerns, exhaust emission standards have become increasingly stringent over the years. The amount of chemical species emitted from an engine may be regulated depending on the type, size, and/or class of engine. One method that has been implemented by engine manufacturers to comply with the regulation of particulate matter exhausted to the environment has been to remove these species from the exhaust flow of an engine with filters. These filters may include filter media to capture and oxidize the particulate matter pollutants contained in the exhaust.

There are several types of filter media that are either available or in development. Wall-flow ceramic cordierite, woven fiber cartridges, and disposable temperature resistant paper are three common types of filter media that are currently in use commercially. Also, knitted silica fiber coils, ceramic foam, wire mesh, and sintered metal substrates are all filter media that have been tested. Most of the filters employing such filter media operate by a similar process of forcing engine exhaust through the filter media which blocks the particulate matter in the exhaust on the inflow side of the media. Using these filters for extended periods of time may cause the particulate matter to buildup in the filter media, impeding the flow of gas through it, resulting in increased pressure drop within the filter and reduced engine efficiency.

Using disposable filter media and filter regeneration are two ways to remove the particulate build up within the filter media. Regeneration is the process of increasing the temperature of the exhaust system until the organic components of the particulate matter such as the soot and the soluble organic fraction (SOF) that accumulated in the filter burn off. If the engine exhaust does not reach the temperature required for regeneration within the filter, an additional component is necessary to raise the temperature within the filter. In some systems this component is an outside heat source that heats the filter media or the engine exhaust before it reaches the filter. A catalyst is sometimes used to lower the regeneration temperature necessary to oxidize the soot and the SOF. For example, some filters include a filter media coated with a noble or base catalyst material, while others include a catalyst upstream of the filter, or include fuel borne catalysts. Both precious and base metals have been used as catalysts in filters. Since pressure drop across a filter results in decreased engine efficiency, the catalyst coating should avoid significant pressure drop across the filter.

U.S. Patent Publication No. US 2006/0057046 A1 (the '046 publication) to Punke et al., describes a catalyzed soot filter with its internal walls coated with different catalyst compositions. The catalyzed soot filter of the '046 publication consists of a conventional ceramic wall flow filter media of a honeycomb structure, with a washcoat containing a platinum group metal or a rare earth metal oxide catalyst coated on its internal walls. The '046 publication discloses coating of the upstream zone and the downstream zone with washcoats with different densities of catalyst loading to account for the non uniformity of the amount of particulate matter accumulating along the length of the filter. The washcoat catalyst loadings in the '046 publication are tailored to account for the fact that a higher proportion of the particulate matter is deposited on the downstream side of the filter. Since a higher proportion of the particulate matter is deposited on the downstream side, this region of the filter will experience the high temperatures during regeneration more than the upstream side. Therefore, the durability of the catalyst coating on the downstream side will limit the useful lifetime of the filter. Thus, the '046 publication seeks to increase the useful lifetime of the filter media by increasing the durability of the metal catalyst which will be exposed to high temperatures during regeneration.

High regeneration temperatures deteriorate the filter media in a filter, limiting the useful life of the filter media. Catalyst coatings on the filter media have the potential of increasing the pressure drop in the filter, with a resulting decrease in engine efficiency, by increasing the resistance to exhaust flow through the filter. The present disclosure is directed to solving one or more of the problems set forth above.

SUMMARY OF THE INVENTION

The present disclosure involves a filter for engine exhaust gases which includes a housing coupled to an engine to receive engine exhaust gases, and a filter media which is located in the housing. The filter media includes a plurality of filter passages, and a plurality of particles of a transition metal deposited on at least a portion of the filter media. The size of the particles are approximately thirty nanometers or less.

The present disclosure also discloses a filter which includes a housing and a filter media located in the housing. The filter media includes a plurality of filter passages, and a plurality of particles of a transition metal deposited on the filter media. At least some of the particles include a whisker having a diameter of approximately thirty nanometers or less, extending generally away from the filter media.

The present disclosure also discloses a method of filtering particulate matter pollutants from exhaust gases through a filter and regenerating the filter. The method includes flowing engine exhaust gases through the filter, and collecting particulate matter from the engine exhaust gases in a filter media of the filter. The filter media includes a plurality of particles of a transition metal catalyst having a size of approximately one hundred nanometers or less deposited on the filter media using metal organic chemical vapor deposition (MOCVD). The method also includes regenerating the filter by combusting the collected particulate matter when a temperature of the filter reaches a regeneration temperature.

SUMMARY DESCRIPTION OF THE DRAWINGS

DETAILED DESCRIPTION

Exemplary embodiments of the present disclosure are illustrated in the accompanying drawings. Wherever possible, the same reference numbers will be used throughout the drawings to refer to the same or like parts.

Figure 1:
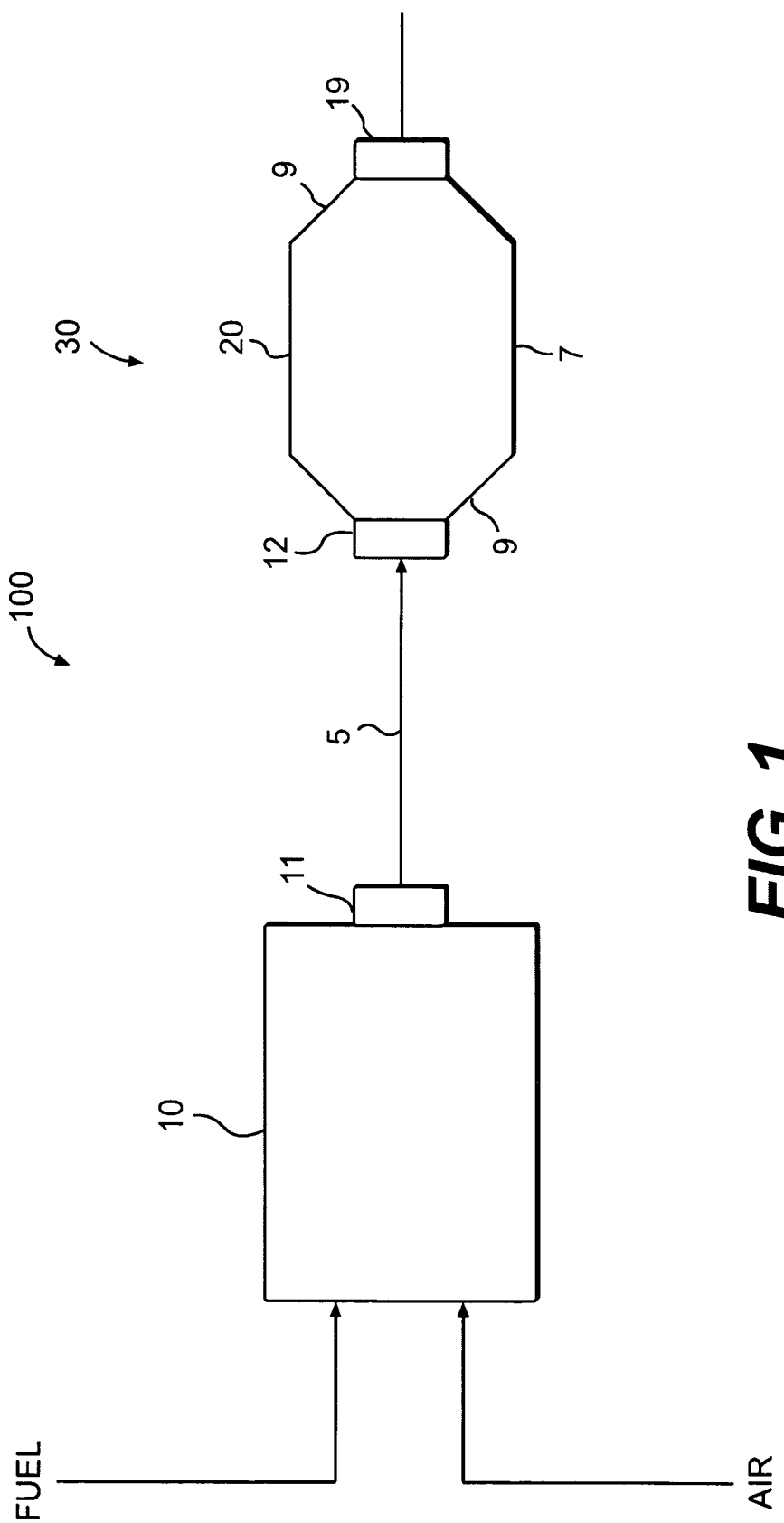
FIG. 1 is a diagrammatic illustration of an engine system having a filter system according to an exemplary embodiment of the present disclosure.

FIG. 1 illustrates an internal combustion engine system 100, having an engine 10, and an exemplary embodiment of a filter system 30 containing a filter 20. Engine 10 may include an exhaust outlet 11 connecting an exhaust flow 5 of engine 10 with an inlet 12 of the filter 20. The engine 10 may be a diesel engine, a gasoline engine, a gaseous fuel driven engine, or any other type of engine that produces exhaust gases, liquids or vapor that require filtering. Engine system 100 may also include a turbine of a turbocharger or an exhaust gas recirculation valve, and/or any other known device connected to the exhaust outlet 11. In such an embodiment, inlet 12 of the filter 20 may be connected upstream or downstream of an outlet of the turbine, the EGR valve, or the other known device.

The filter 20 illustrated in FIG. 1 may be any general type of exhaust filter known in the art and may include a cylindrical housing 7 with tapered ends 9. It is understood that other filter housing shapes could be used in association with this disclosure.

Figure 2:
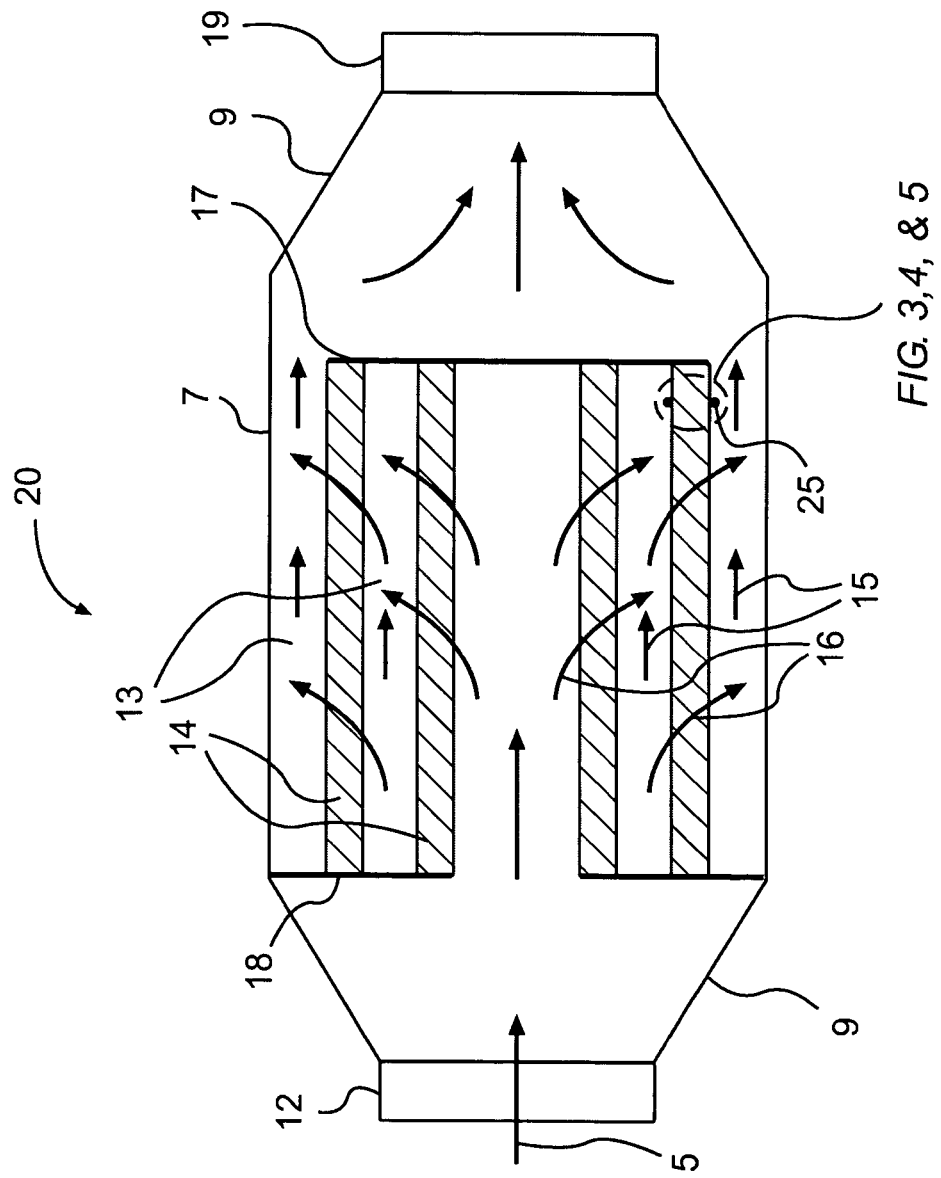
FIG. 2 is a cross-sectional illustration of the filter in FIG. 1 showing an exemplary embodiment of the filter media.

FIG. 2 shows a cross section of the filter 20 of FIG. 1 showing filter media 14 contained within the filter 20. The filter media 14 can be of any type known in the art, such as, for example, a ceramic foam, ceramic, sintered metal, metal foam, or silicon carbide, or silicon carbide foam type filter. The filter media 14 assists in removing particulate matter like soot, soluble organic fraction (SOF), and other pollutants from engine exhaust flow 5. The filter media 14 may contain heating elements capable of heating the filter media 14 and the exhaust during a regeneration process. The filter media 14 may be situated horizontally, vertically, radially, or in any other configuration allowing for proper filtration. The filter media 14 may also be of a honeycomb, mesh, mat, or any other configuration that provides an appropriate surface area available for filtering of particulate matter. The filter media 14 may also contain pores, cavities or spaces of a size that allows exhaust gas to flow through while substantially restricting the passage of particulate matter. The flow of exhaust through the pores of the filter media 14 is illustrated by the arrows 16 in FIG. 2.

In an exemplary embodiment, the filter media 14 may define a plurality of filter passages 13. The filter passages 13 may be arranged in any configuration known in the art. For example, the filter passages 13 may be substantially parallel channels extending in an axial direction. The filter passages 13 may be, for example, flat, cylindrical, square tube-shaped, or any other shape known in the art. The filter passages 13 may also be configured to allow exhaust gas to pass between adjacent filter passages 13 while substantially restricting the passage of particulate matter. The flow of exhaust through the filter passages 13 is illustrated by arrows 15 in FIG. 3.

In an exemplary embodiment, a plurality of filter passages 13 may be substantially blocked or closed proximate the inlet 12 of the filter 20 such that gas may not enter certain filter passage 13 at the inlet blocked end 18, but rather be directed to particular inflow surfaces of the filter media 14. A plurality of filter passages 13 may also be substantially blocked or closed proximate the outlet 19 of the filter 20 such that gas may not exit the filter passage 13 at the outlet blocked end 17, but rather be directed to other portions of the filter media 14.

Figure 3:
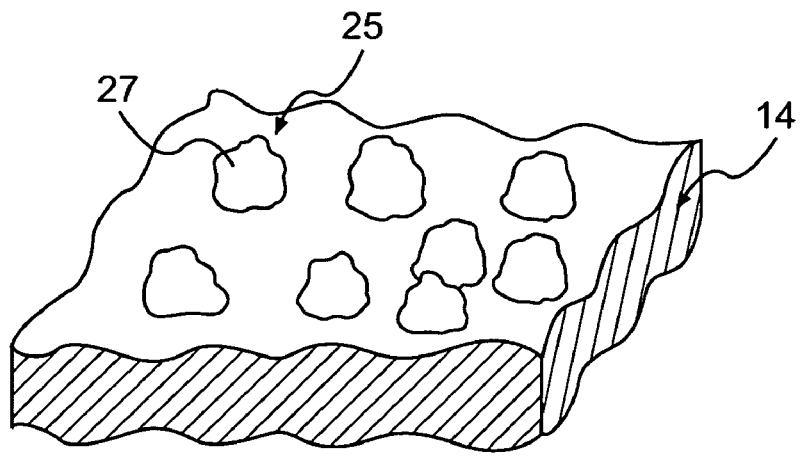
FIG. 3 is an enlarged diagrammatic illustration of a region of the filter media identified in FIG. 2, showing deposited nanometer sized particles according to one embodiment of the present disclosure.
Figure 4:
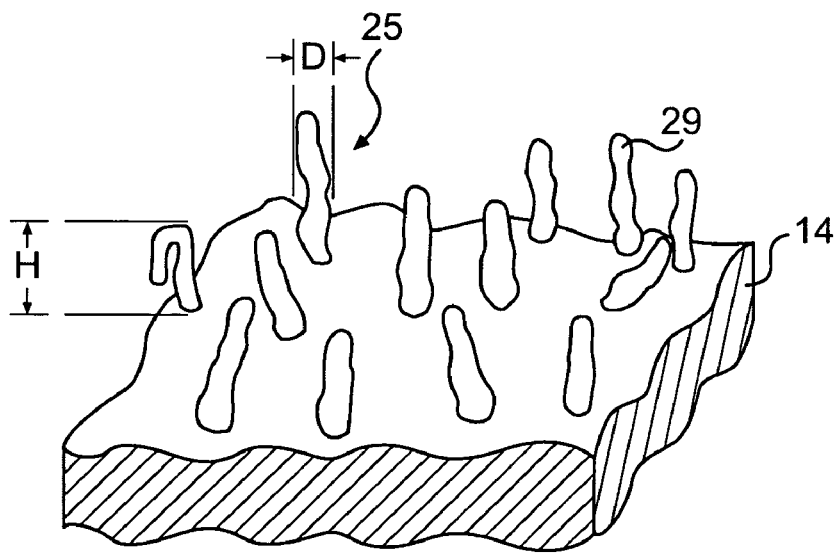
FIG. 4 is an enlarged diagrammatic illustration of a region of the filter media in FIG. 2 showing deposited nanometer sized particles according to another embodiment of the present disclosure.
Figure 5:
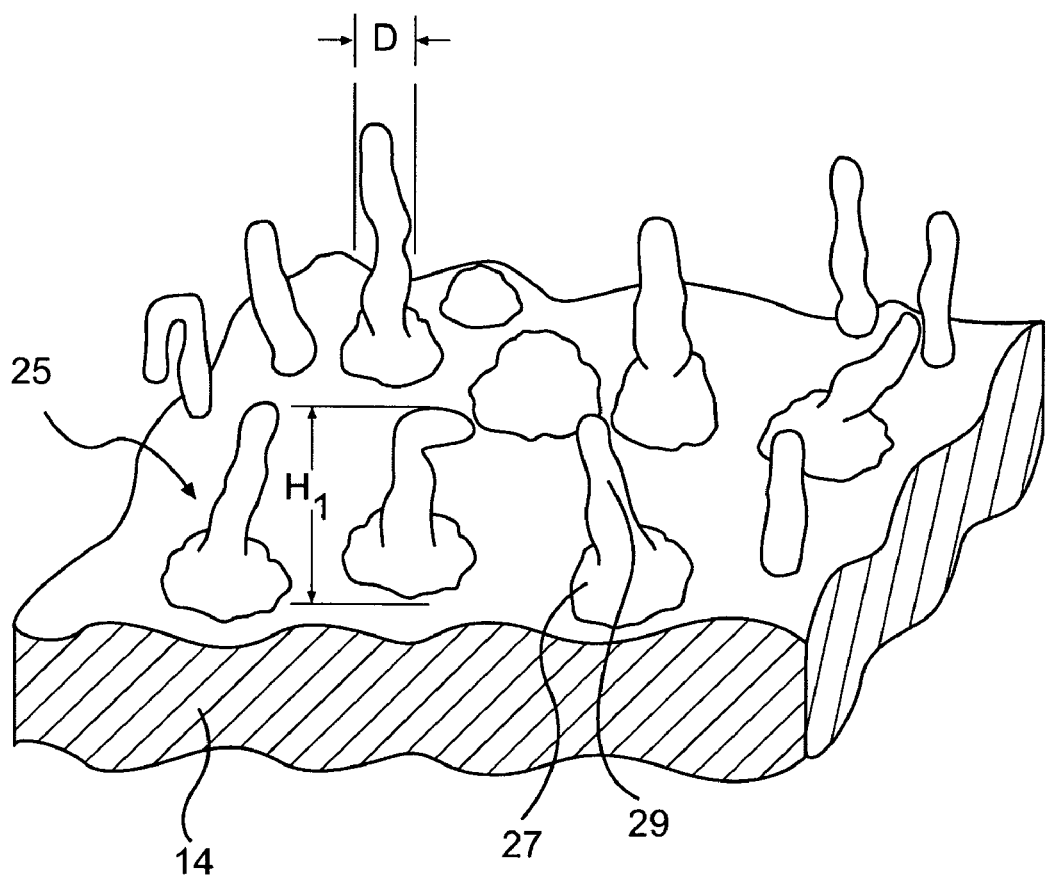
FIG. 5 is an enlarged diagrammatic illustration of a region of the filter media in FIG. 2 showing the deposited nanometer sized particles according to another embodiment of the present disclosure.

FIG. 3, FIG. 4, and FIG. 5 show an enlarged view of the filter media 14 of filter 20. The filter media 14 may include nanometer sized particles 25 deposited on a surface of the filter media 14. The particles 25 may include a transition metal capable of serving as a catalyst. The 40 chemical elements in groups 3 through 12 of the periodic table, for example copper, gold, platinum, palladium, and rhodium are transition metals.

FIG. 3 shows an embodiment of the present disclosure where the particles 25 includes a base portion 27 of any shape, which is approximately thirty nanometers in size or less. The size of these particles 25 can be as small as one nanometer. The size of the particle 25 refers to the diameter of a sphere which circumscribes the particle.

FIG. 4 shows another embodiment of the present disclosure where the particles 25 includes a whisker 29 oriented to protrude away from the filter media 14. The diameter of the whisker (D) can be approximately thirty nanometers or less. The maximum height of the whisker (H) can vary from approximately fifty nanometers to one nanometer. As indicated in FIG. 4, the height of the whisker (H) refers to the height of the whisker above the filter media 14.

FIG. 5 shows another embodiment of the present disclosure where the particle 25 includes a base portion 27, and a whisker portion 29 protruding from the base portion 27. The base portion 27 can have a size from approximately thirty nanometers down to one nanometer. The maximum height ($H_1$) of the particle 25 including the base portion 27 and the whisker portion 29 can vary from approximately fifty nanometers to one nanometer. The diameter of the whisker portion 29 (D) can be approximately thirty nanometers or less. The size of the base portion refers to the diameter of a sphere which circumscribes the base portion, and the diameter of the whisker portion refers to diameter of a circle which circumscribes a cross-section of the whisker portion along a plane normal to the central axis of the whisker portion.

The particles 25 can be deposited on the filter media 14 as discrete particles where each particle 25 is separated from another by a distance, or can be deposited to form a continuous film, or a configuration in between where some regions of the filter media 14 will have discrete particles 25 while other sections will have particles 25 joined together to form islands of metal. The particles 25 can also be deposited on all exposed surfaces of the filter media 14 or selectively on certain regions of the filter media 14.

INDUSTRIAL APPLICABILITY

The disclosed filter system 30 comprising a filter 20 and a filter media 14 with deposited particles 25 of a transition metal acting as a catalyst, may be used with any type of engine system 100 that exhausts chemical species including diesel engines, gasoline engines, or gaseous fuel driven engines. The engine system 100 may be a part of any mobile or stationary machine that generates exhausts containing various regulated species like soot, soluble organic fraction (SOF), sulphates, and ash. The engine exhausts are passed through the filter 20 comprising the filter media 14 with deposited metal particles 25 that act as the catalyst. As the exhaust flows through the filter media 14, particulate matter including soot and SOF gets accumulated on or within the filter media 14. The collected particulate matter increases the resistance to exhaust flow through the filter 20, thereby increasing the pressure drop within the filter 20. When the filter pressure drop exceeds a set value, regeneration of the filter 20 is carried out.

Regeneration is the process by which the collected particulate matter is removed by oxidation. By this process, the solid particulate matter collected on the filter media 14 is burned to form gaseous and liquid products, which are carried along with the gases exiting the filter. For regeneration to occur, the temperature of the particulate matter collected on the filter media 14 should exceed the regeneration temperature. The temperature of the filter media 14 can be increased by enriching the air to fuel mixture, or active heating of the filter media 14, or by any other technique used in the art.

Reduced regeneration temperatures increase the durability of the filter 20. The presence of a catalyst promotes the oxidation reaction by reducing the regeneration temperature. The chemical reactivity of the catalysts increases with decreasing particle size. Thus, the presence of the catalyst in the form of nanometer sized particles 25 increases the chemical reactivity of the catalyst, thereby decreasing the regeneration temperature further.

Metal Organic Chemical Vapor Deposition (MOCVD) has been used to deposit the nanometer sized metal particles 25 on the filter media 14. Any other suitable technique including thermal CVD, low-pressure CVD, electron-assisted CVD, or plasma-assisted CVD, or combustion based methods, that are capable of depositing atomic sized particles on all surfaces of an irregular shaped filter media can be used. The ability to deposit atomic layers of the metal allows control of the size and thickness of the deposited particles 25. Using MOCVD, particles 25 from approximately thirty nanometers in size down to about one nanometer, are deposited on filter media 14. To deposit platinum particles 25 of approximately ten nanometer in size on a filter media 14, the filter media 14 is placed in a vacuum chamber and the chamber heated to 450° C. while its pressure is decreased to about 10 Torr, and a precursor of Platinum Acetyl Acetonate is introduced into the chamber along with Argon gas at a flow rate of about 25 cc/min for about 2 hours. By controlling the process variables like chamber pressure, temperature, gas flow rate and deposition time, the size and shape of the metal particles 25 can be varied. Since the MOCVD technique involves only one process step to deposit the particles 25 on the filter media 14, additional cost savings can be realized from the reduced number of process steps.

As noted above, the nanometer sized particles 25 deposited on the filter media 14 can be of any shape. The oxidation rate of particulate matter can be increased by increasing the surface area of the metal catalyst exposed to the exhaust gases. To increase the surface area of the metal particles 25 in contact with the exhaust gases, the particles 25 may include a whisker 29 protruding from the filter media. The particle 25 may also include a base portion 27 between the whisker portion and the filter media. These whiskers 29 increases the surface area of the catalyst which is in contact with the engine exhausts, thereby increasing oxidation. To further increase the surface area of the catalyst in contact with the exhaust, the particles 25 can be deposited on substantially the entire surface of the filter media 14, or be deposited on selected surfaces to optimize regeneration performance of the filter 20. The filter media 14 may include particles 25 that may be composed of the base 27, the whisker 29, both the base portion 27 and the whisker portion 29, or a combination of these. Since the physical size of the particles 25 are small, they do not increase the resistance to exhaust gas flow through the filter. That is, the increase in pressure drop due to the deposited particles 25 will be small.

It will be apparent to those skilled in the art that various modifications and variations can be made to the shape and size of the deposited particles 25, the deposited pattern of these particles 25 on the filter media 14, and the process used to deposit them. Other embodiments will be apparent to those skilled in the art from consideration of the specification and practice of the disclosed filter system 30, comprising a filter 20, a filter media 14 with particles 25 of any transition metal deposited on it. It is intended that the specification and examples be considered as exemplary only, with a true scope being indicated by the following claims and their equivalents.

What is claimed is:

1. A filter for engine exhaust gases, comprising:
   a housing configured to receive engine exhaust gases; and
   a filter media located in the housing, the filter media including
      a plurality of filter passages; and
      a plurality of particles of a transition metal deposited on at least a portion of the filter media, the particles including a base portion attached to the filter media and a whisker portion that extends generally away from the base portion, the base portion having a different diameter than the whisker portion, the height of the particles being approximately fifty nanometers or less.

2. The filter of claim 1, wherein the particles are deposited such that there is a gap between adjacent particles.

3. The filter of claim 1, wherein the particles are deposited such that adjacent particles are contiguous.

4. The filter of claim 1, wherein the particles are deposited on substantially all surfaces of the filter media.

5. The filter of claim 1, wherein the transition metal includes one of platinum, palladium, or rhodium.

6. The filter of claim 1, wherein the particles are chemical vapor deposited (CVD) particles.

7. The filter of claim 1, wherein the particles are metal organic chemical vapor deposited (MOCVD) particles.

8. A filter for engine exhaust gases, comprising:
   a housing configured to receive engine exhaust gases; and
   a filter media located in the housing, the filter media including
      a plurality of filter passages; and
      a plurality of particles of a transition metal deposited on at least a portion of the filter media, the particles including a base and a whisker that extends generally away from the filter media, the height of the particles being approximately fifty nanometers or less, the whisker forming a whisker portion and the particle further including a base portion between the filter media and the whisker portion, the base portion being attached to the filter media and the whisker portion being attached to the base portion, the size of the base portion being approximately thirty nanometers or less.

9. The filter of claim 1, wherein the maximum height of the whisker is approximately fifty nanometers or less.

10. The filter of claim 8, wherein the particles are deposited such that there is a gap between adjacent particles.

11. The filter of claim 8, wherein the particles are deposited such that adjacent particles are contiguous.

12. The filter of claim 8, wherein the particles are deposited on substantially all the surfaces of the filter media.

13. The filter of claim 8, wherein the transition metal includes one of platinum, palladium, or rhodium.

* * * * *